United States Patent [19]

Lew

[11] Patent Number: 4,973,062
[45] Date of Patent: Nov. 27, 1990

[54] VORTEX FLOWMETER

[76] Inventor: Hyok S. Lew, 7890 Oak St., Arvada, Colo. 80005

[21] Appl. No.: 287,160

[22] Filed: Dec. 21, 1988

Related U.S. Application Data

[63] Continuation-in-part of Ser. No. 12,680, Feb. 9, 1987, Pat. No. 4,803,870, and a continuation-in-part of Ser. No. 31,902, Mar. 30, 1987, Pat. No. 4,807,481, and a continuation-in-part of Ser. No. 105,265, Oct. 7, 1987, Pat. No. 4,879,909, and a continuation-in-part of Ser. No. 133,315, Dec. 16, 1987, Pat. No. 4,911,019, and a continuation-in-part of Ser. No. 147,812, Jan. 25, 1988, Pat. No. 4,884,458.

[51] Int. Cl.$^5$ ............................................... G01F 1/32
[52] U.S. Cl. ................................................... 73/861.24
[58] Field of Search ............ 73/861.04, 861.22, 861.24

[56] References Cited

U.S. PATENT DOCUMENTS 4,069,708  1/1978  Fussell, Jr. ..................... 73/861.24
4,181,020  1/1980  Herzl ............................. 73/861.24
4,776,222 10/1988  Lew ............................. 73/861.22 X
4,835,436  5/1989  Lew ............................. 73/861.22 X Primary Examiner—Jerry W. Myracle

[57] ABSTRACT

A vortex flowmeter comprises a vortex generator (1) of an elongated cylindrical shape disposed across a first cross section of a flow passage (2) and a vortex sensor (4) of a planar geometry disposed across a second cross section of the flow passage (2) generally parallel to the vortex generator (1), wherein at least one extremity of the vortex sensor is secured to the wall (3) of the flow passage (2) and a deflective portion (7) of the vortex sensor (4) is connected to a force transmitting member (9) extending from a transducer (10) by a mechanical coupling (11). The volume flow rate is determined from the frequency of the fluctuating electric signal generated by the transducer (10) as a result of vortices generated by the vortex generator (1) and the mass flow rate is determined from a combination of the frequency and amplitude of the fluctuating electric signal generated by the transducer (10).

17 Claims, 3 Drawing Sheets

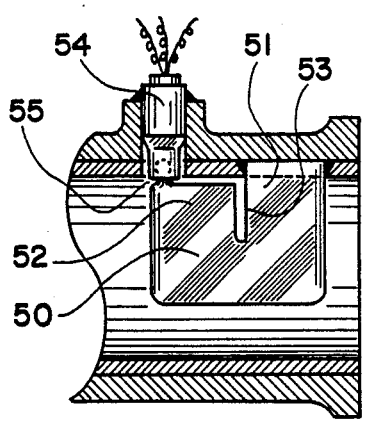
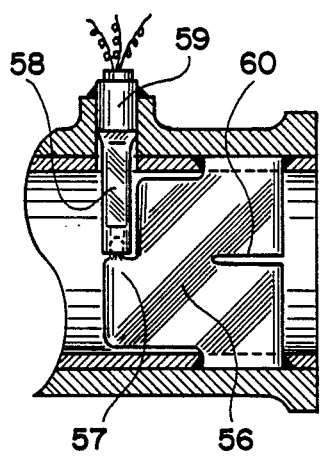
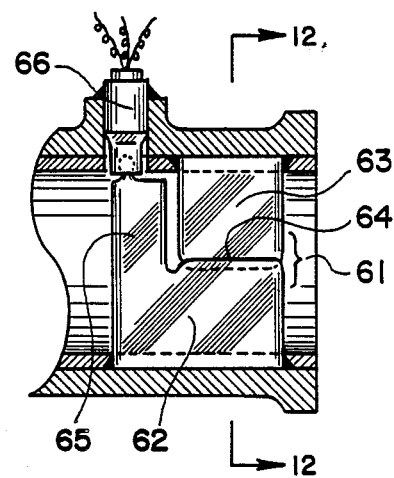
Fig. 9    Fig. 10    Fig. 11
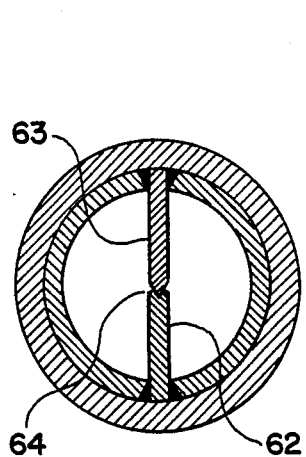
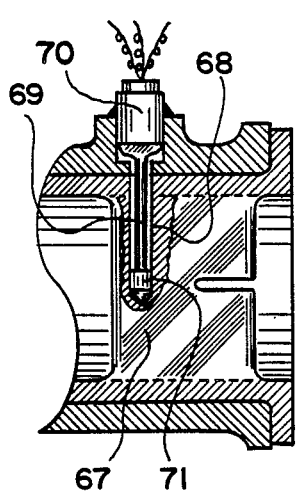
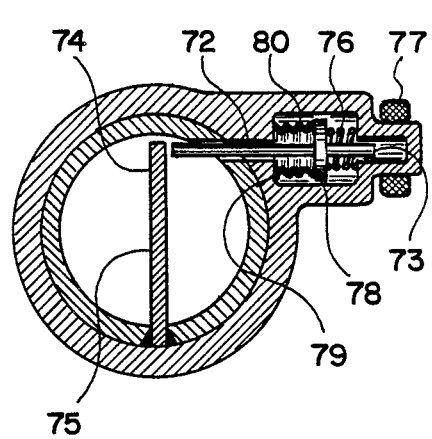
Fig. 12    Fig. 13    Fig. 14
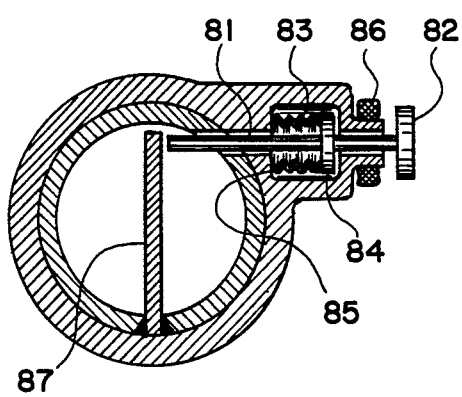
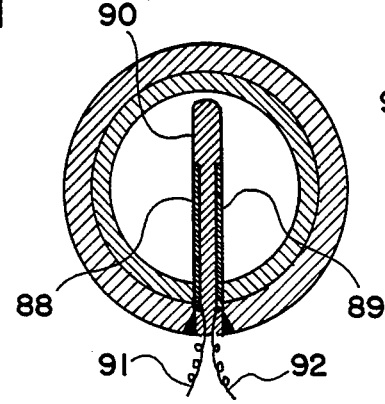
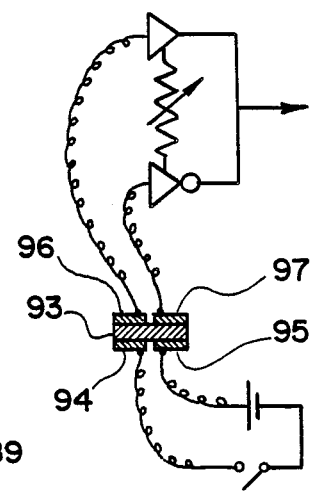
Fig. 15    Fig. 16    Fig. 17

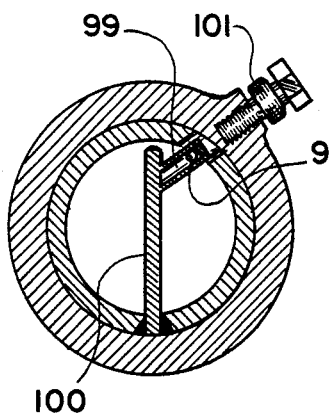
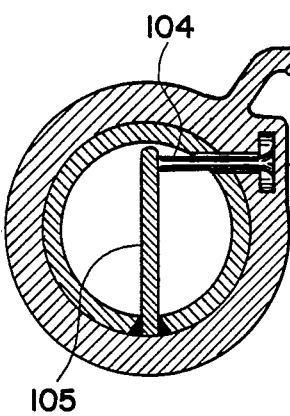
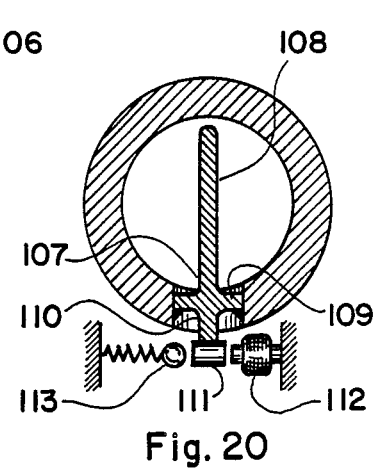
Fig. 18  Fig. 19  Fig. 20
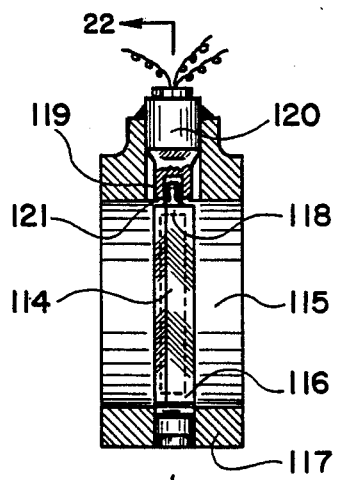
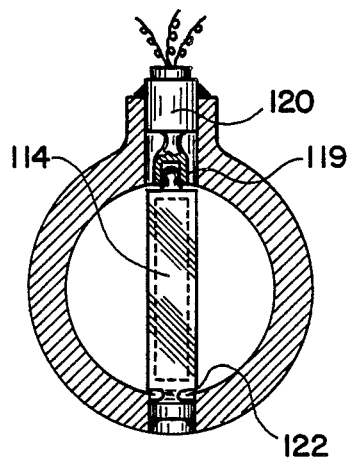
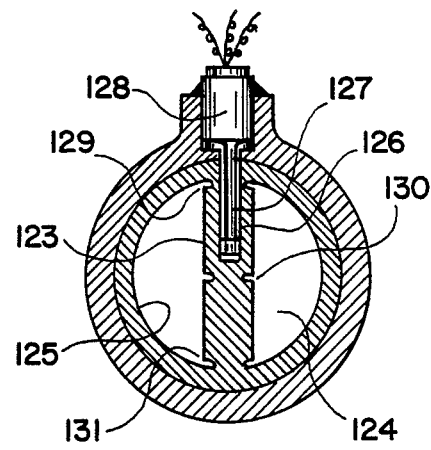
Fig. 21  Fig. 22  Fig. 23
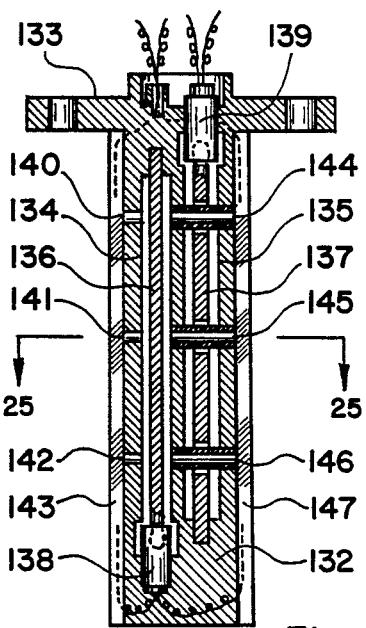
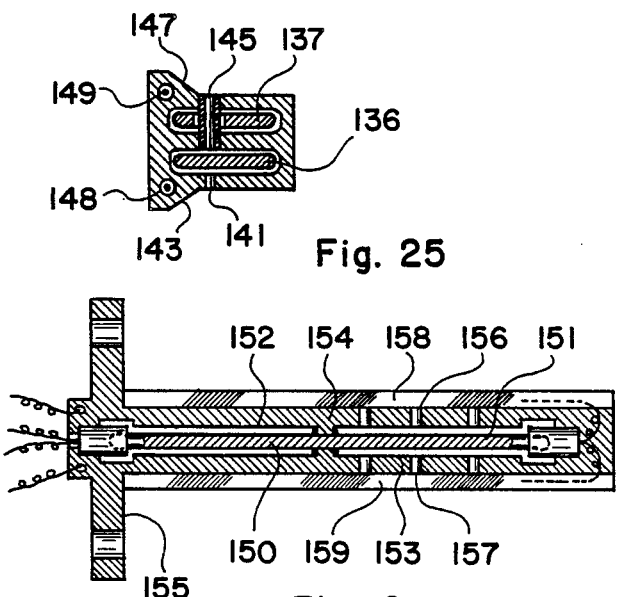
Fig. 24  Fig. 25  Fig. 26

VORTEX FLOWMETER

This patent application is a Continuation-in-part application to patent application Ser. No. 012,680 entitled "Vortex Shedding Flowmeter with Mechanically Amplifying Pressure Sensor" filed on Feb. 9, 1987, now U.S. Pat No. 4,803,870; Ser. No. 031,902 entitled "Three-in-one Vortex Shedding Flowmeter" filed on Mar. 30, 1987, now U.S. Pat. No. 4,807,481; Ser. No. 133,315 entitled "Vortex Shedding Flowmeter" filed Oct. 7, 1987, now U.S. Pat. No. 4,879,909; Ser. No. 133,315 entitled "High Sensitivity-High Resonance Frequency Vortex Shedding Flowmeter" filed on Dec. 16, 1987, now U.S. Pat. No. 4,911,019; and Ser. No. 147,812 entitled "High Sensitivity Vortex Shedding Flowmeter" filed on Jan. 25, 1988, now U.S. Pat. No. 4,884,458.

A vortex flowmeter comprises a vortex generator of an elongated cylindrical shape disposed generally perpendicular to the fluid flow, and a vortex sensor including a planar member with at least one extremity secured to a rigid boundary of the fluid stream and submerged in the fluid flow wherein a deflective portion of the planar member is connected to a transducer by a mechanical coupling. The velocity of the fluid flow is determined from the frequency of the alternating fluid dynamic force generated by the vortices shed from the vortex generator and experienced by the vortex sensing planar member. The mass flow rate of the fluid is determined from a combination of the frequency and the amplitude of the alternating fluid dynamic force generated by the vortices. The mechanical coupling connecting the deflective portion of the vortex sensing planar member to the transducer tremendously enhances the transmission of the alternating fluid dynamic force from the vortex sensing planar member to the transducer, while it suppresses the transmission of the mechanical vibrations of small amplitudes experienced by the vortex sensing member. A calibration device exerting a mechanical impulse of known magnitude to the vortex sensing planar member and measuring the electrical impulse from the transducer generated by the mechanical impulse determines the conversion factor that converts the amplitude of the alternating electric signals from the transducer to the amplitude of the alternating fluid dynamic force generated by the vortices, from which the mass flow rate is determined.

The existing versions of the vortex flowmeter measure the fluid velocity only by detecting the frequency of the vortex shedding, which existing versions are not capable of measuring low velocity fluid flows, as they are only capable of measuring velocities generally greater that 30 feet per second in air flows and higher than 2 feet per second in water flows. The use of a vortex sensing planar member with a chord length significantly greater than the thickness of the vortex generating bluff body disposed downstream of the vortex generating bluff body and with a deflective portion thereof connected to a transducer drastically increases the capability of detecting the alternating fluid dynamic force generated by weak vortices and, consequently, the vortex flowmeter employing such a vortex sensing planar member is capable of measuring low fluid velocities as low as 6 feet per second air velocity and 0.5 feet per second water velocity. The vortex shedding flowmeter with such a vortex sensing planar member is also capable of measuring the mass flow rate of fluid, as the amplitude of the fluid dynamic force generated by the vortices and experienced by such a vortex sensing planar member is generally proportional to the dynamic pressure of the fluid flow that is equal to one half of the fluid density times the square of the fluid velocity. Of course, the fluid density can be determined as the ratio of the mass flow rate to the volume flow rate.

The primary object of the present invention is to provide a vortex flowmeter comprising a vortex sensing planar member with at least one extremity secured to a rigid boundary of the fluid stream, wherein a deflective portion thereof is connected to a force transmitting member extending from a transducer assembly by a mechanical coupling.

Another object is to provide a vortex flowmeter that determines fluid velocity from the frequency of the alternating fluid dynamic force generated by the vortices and experienced by the vortex sensing planar member.

A further object is to provide a vortex flowmeter that determines mass flow rate of the fluid flow from a combination of the frequency and the amplitude of the alternating fluid dynamic force generated by the vortices and experienced by the vortex sensing planar member.

Yet another object is to provide a vortex flowmeter that determines the fluid density as a ratio of the mass flow rate to the volume flow rate.

Yet a further object is to provide a vortex flowmeter with a calibration device imposing a mechanical impulse to the combination of the vortex sensor and transducer and measuring an electrical impulse from the transducer generated by the mechanical impulse, which calibration device determines the conversion factor that converts the amplitude of the electrical signal from the transducer to the amplitude of the fluid dynamic force generated by the vortices.

Still another object is to provide a vortex flowmeter with a Piezo electric transducer providing two electric signals which can be combined to eliminate noise and extract a pure signal representing the fluid dynamic force generated by the vortices.

These and other objects of the present invention will become clear as the description thereof progresses. The present invention can be described with a great clarity and specificity by referring to the following figures:

FIG. 1 illustrates a cross section of a vortex flowmeter including a vortex sensing planar member with a significant chord length disposed downstream of the vortex generating bluff body, that is connected to a transducer by a mechanical coupling and including a device providing a calibration relationship between the amplitude of the electric signals from the transducer and the amplitude of the fluid dynamic force on the planar member.

FIG. 9 illustrates a cross section of a further embodiment of the vortex flowmeter including a vortex sensing planar member with a significant chord length.

FIG. 10 illustrates a cross section of yet another embodiment of the vortex flowmeter including a vortex sensing planar member with a significant chord length.

FIG. 11 illustrates a cross section of yet a further embodiment of the vortex flowmeter including a vortex sensing planar member with a significant chord length.

FIG. 12 illustrates another cross section of the embodiment shown in FIG. 11.

FIG. 13 illustrates a cross section of still another embodiment of the vortex flowmeter including a vortex sensing planar member with a significant chord length.

FIG. 14 illustrates another embodiment of the device providing the calibration relationship between the amplitude of the electrical signal from the transducer and the amplitude of the fluid dynamic force experienced by the vortex sensing planar member.

FIG. 15 illustrates a further embodiment of the device providing the calibration relationship between the electrical signal and the fluid dynamic force.

FIG. 16 illustrates yet another embodiment of the device providing the calibration relationship between the electrical signal and the fluid dynamic force.

FIG. 17 illustrates yet a further embodiment of the device providing the calibration relationship between the electrical signal and the fluid dynamic force.

FIG. 18 illustrates still another embodiment of the device providing the calibration relationship between the electrical signal and the fluid dynamic force.

FIG. 19 illustrates still a further embodiment of the device providing the calibration relationship between the electrical signal and the fluid dynamic force.

FIG. 20 illustrates yet still another embodiment of the device providing the calibration relationship between the electrical signal and the fluid dynamic force.

FIG. 21 illustrates a cross section of a vortex flowmeter including a vortex generating bluff body that also functions as a vortex sensor, as one extremity thereof is connected to a transducer by a mechanical coupling.

FIG. 22 illustrates another cross section of the embodiment shown in FIG. 21.

FIG. 23 illustrates a cross section of another embodiment of the vortex flowmeter including the vortex generating-sensing bluff body connected to a transducer by a mechanical coupling.

FIG. 24 illustrates a cross section of a vortex generator-sensor.

FIG. 25 illustrates another cross section of the embodiment shown in FIG. 24.

FIG. 26 illustrates a cross section of another embodiment of the vortex generator-sensor.

Figure 1:
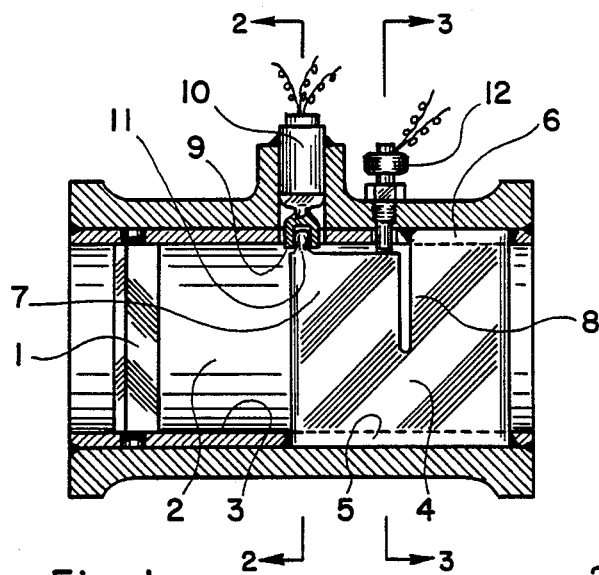

In FIG. 1 there is illustrated an embodiment of the vortex flowmeter of the present invention. The vortex generator or bluff body 1 of elongated cylindrical shape is disposed across a first cross section of the flow passage 2 and secured to the rigid boundary or wall 3 of the flow passage. A vortex sensor of a planar shape 4 is disposed generally parallel to and downstream of the vortex generator 1 across a second cross section of the flow passage 2 on a plane generally parallel to the central axis of the flow passage 2. One extremity 5 of the planar member 4 is secured to the wall 3 of the flow passage 2, while the downstream half 6 of the other extremity is also secured to the wall 3 of the flow passage 2. The unsecured upstream half 7 partially separated from the secured downstream half 6 by a slit 8 is connected to a force transmitting member 9 extending from a transducer assembly 10 by a mechanical coupling 11, which may be a socket coupling as shown in the particular illustrated embodiment or other mechanical couplings providing a joint of relatively low stiffness such as a threaded coupling, hinge coupling, welded coupling with a reduced solid cross section, etc. This embodiment of the vortex flowmeter also includes a calibration device 12 that provides the ratio between the amplitude of the electrical signal from the transducer 10 and the amplitude of the fluid dynamic force experienced by the planar member 4. It should be understood that only a portion of the extremity 5 of the planar member 4 may be secured to the wall 3 and that the slit 8 may be omitted or additional slits may be added. It must also be understood that the upstream half 7 of the other extremity of the planar member 4 may be secured to the wall 3, while the downstream half thereof is connected to the force transmitting member 11 of the transducer 10.

Figure 2:
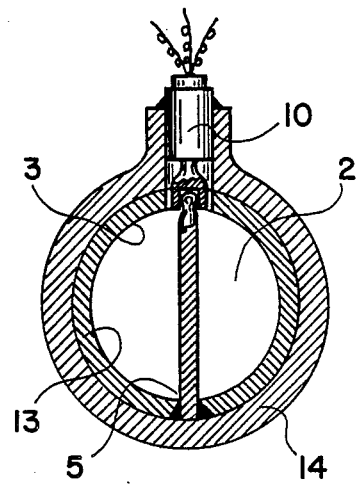
FIG. 2 illustrates another cross section of the embodiment shown in FIG. 1.

In FIG. 2 there is illustrated another cross section of the embodiment shown in FIG. 1, which cross section is taken along plane 2—2 as shown in FIG. 1. There is a certain advantage in manufacturing from the fact that the vortex sensing planar member 4 is secured to an insertion sleeve 13 at one extremity 5 by a welding, which insert sleeve 13 is fitted into a bore included in the flowmeter body 14. The transducer assembly 10 engages a hole extending through the wall of the flowmeter body 14 and the insertion sleeve 13 and is secured to the flowmeter body 14 by a weld as shown in the particular illustrated embodiment or by other mechanical anchoring means such as threaded or flanged fastening. One or both extremities of the planar member 4 may be secured to the wall 3 of the flow passage 2 by other fastening means such as a socket or pressure fitted anchoring instead of the welding shown in the particular embodiment.

Figure 3:
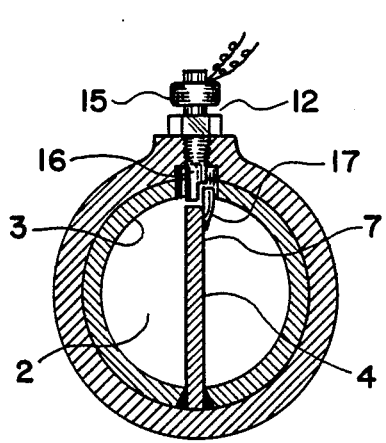
FIG. 3 illustrates a further cross section of the embodiment shown in FIG. 1.

In FIG. 3 there is illustrated a further cross section of the embodiment shown in FIG. 1, which cross section is taken along plane 3—3 as shown in FIG. 1. The calibration device 12 includes a solenoid coil 15 and a core 16 made of a ferromagnetic material extending through the wall 3 and into the flow passage 2, where the core 16 is terminated in such a way that there is a narrow lateral gap between the side of the core 16 and a ferromagnetic element 17 affixed to the unsecured upstream half 7 of the vortex sensing planar member 4. This arrangement of the calibration device is particularly adapted to a vortex flowmeter made of a nonmagnetic material.

Figure 4:
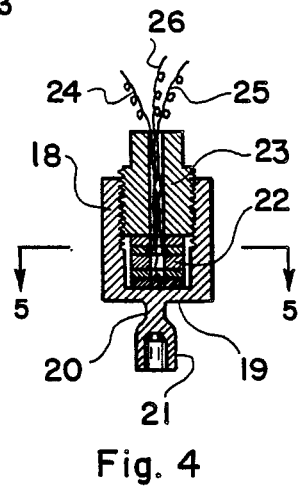
FIG. 4 illustrates a cross section of a Piezo electric transducer suitable for the conversion of the fluid dynamic force experienced by the vortex sensing planar member to an electromotive force.

In FIG. 4 there is illustrated a cross section of the transducer assembly 10 included in the embodiment shown in FIG. 1. The container vessel 18 has a relatively thin wall 19 reinforced by a rib 20 extending diametrically thereacross in a direction parallel to the central axis of the flow passage 2, from which thin wall the force transmitting member 21 with a mechanical coupling means included in the extremity thereof extends. A Piezo electric element 22 is disposed within the container vessel 18 and pressed onto the thin wall 19 by the threaded plug 23 threadedly plugging up the open end of the container vessel. The Piezo electric element 22 is electrically insulated from the container vessel as required by the condition dictated by the function thereof and connected to the conductor wires 24, 25 and 26 routed through a hole axially included in the plug 23.

Figure 5:
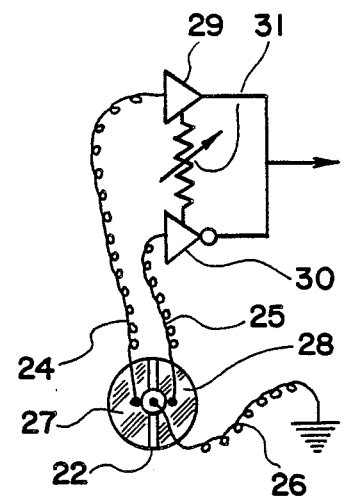
FIG. 5 illustrates another cross section of the transducer shown in FIG. 4 and an electronic circuit employed to refine the electric signal from the Piezo electric element included in the transducer.

In FIG. 5 there is illustrated a view of the Piezo electric element 22 taken across plane 5—5 as shown in FIG. 4, and an embodiment of the electronic circuit employed to cancel noise and extract the refined signal. The Piezo electric element 22 of a circular disc shape is polarized in a direction perpendicular to a plane including the disc. At least one side of the Piezo electric element has two electrodes 27 and 28 disposed opposite to one another about a plane including the reinforcing rib 20 disposed generally parallel to the vortex sensing planar member 4, while the other side has a single or split pair of electrodes grounded by the wire 26. The two electrodes 27 and 28 are respectively connected to an amplifier 29 and an inverting amplifier 30 by the two wires 24 and 25. The two electric signals respectively amplified by the amplifiers 29 and 30 are balanced by means of variable resistors 31 or other methods of variable gains and combined in such a way that the noises are cancelled therebetween and a refined output signal is obtained.

The vortex flowmeter illustrated in FIGS. 1, 2 and 3 with the transducer assembly shown in FIGS. 4 and 5 operates on the following principles : The vortex generating bluff body 1 sheds vortices from the two sides thereof in an alternating pattern, which create sinuating streamlines trailing the vortex generating bluff body 1. The vortex sensing planar member 4 submerged in the sinuating streamlines experiences an alternating fluid dynamic force changing its direction at the same frequency as that of the vortex shedding, which alternating fluid dynamic force has an amplitude generally proportional to the dynamic pressure of the fluid that is equal to one half of the fluid density times the square of the fluid velocity. The fluid dynamic force experienced by the vortex sensing planar member 4 is transmitted to the transducer assembly 10 by the mechanical coupling 11 connecting a deflective portion 7 of the planar member 4 to the force transmitting member 9 of the transducer assembly 10. The fluid velocity or the volume flow rate through the flow passage 2 is determined from the frequency of the alternating electrical signal generated by the transducer 10, as the former is linearly dependent on the latter in a wide range of fluid velocity. The actual relationship between the fluid velocity and the vortex shedding frequency including the nonlinear relationship therebetween in a low Reynolds number is determined by calibrating the flowmeter, which is then stored in the memory of the data processor determining the fluid velocity or volume flow rate from the vortex shedding frequency. The mass flow rate of the fluid flow is determined from a combination of the frequency and the amplitude of the alternating electrical signals generated by the transducer, as the amplitude of the alternating electrical signals is proportional to the dynamic pressure of the fluid flow. The ratio of the amplitude of the alternating fluid dynamic force to that of the alternating electrical signal may be a constant or may vary as a function of the fluid velocity, which ratio therebetween is determined by calibrating the flowmeter. If the amplitude ratio does not change depending on the operating conditions and aging in time, the numerical values of the amplitude ratio determined by the calibration process is stored in the memory of the data processor determining the mass flow rate from the combination of the frequency and the amplitude of the electrical signal generated by the transducer assembly 10. If the numerical values of the amplitude ratio change as a function of operating conditions and aging in time, it is necessary to include the calibrating device such as that shown in FIG. 3. The electromagnet 12 exerts a lateral force of known magnitude on the vortex sensing planar member 4 in a single or a series of pulses, which mechanical impulse generates an electrical pulse from the transducer 10. The ratio between the amplitude of the mechanical impulse imposed on the planar member 4 and the amplitude of the electrical pulse generated by the transducer 10 as a result of the mechanical impulse provides the amplitude ratio determining the conversion factor that determines the amplitude of the fluid dynamic force from the amplitude of the electrical signal. The calibration of the amplitude ratio may be performed on an on and off basis or on a continuous basis. The electrical pulse generated by the imposed mechanical impulse can be distinguished from the electrical signal generated by the vortices when a mechanical impulse of magnitude significantly greater than the amplitude of the fluid dynamic force is employed, or the mechanical impulse is imposed in a series at a frequency that is separated from the vortex shedding frequencies by an electronic filter. The amplitude ratio determined by the calibration device may be stored in the memory of the data processor or directly used by the data processor on a real time basis in determining the amplitude of the fluid dynamic force experienced by the vortex sensing planar member 4 from the amplitude of the electrical signal generated by the transducer 10. It should be mentioned that the vortex flowmeter shown in FIGS. 1, 2 and 3 may employ a strain gauge transducer or a capacitance transducer in place of the Piezo electric transducer shown in the particular embodiment as such other types of the transducers are readily available to those skilled in the art. As the present invention operates in conjunction with many different types of transducers, the present invention is not limited to the particular embodiment using a Piezo electric transducer.

Figure 6:
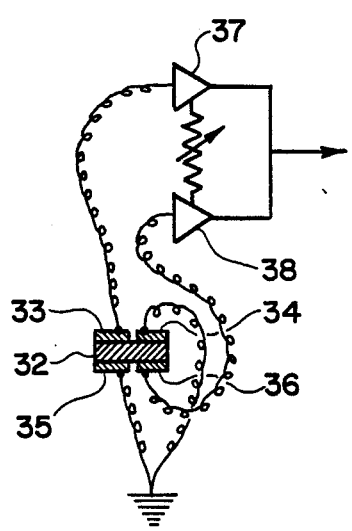
FIG. 6 illustrates another embodiment of the electronic circuit refining the electric signal from another embodiment of the Piezo electric element included in the transducer shown in FIG. 4.

In FIG. 6 there is illustrated a cross section of another embodiment of the Piezo electric element, which cross section is taken along a plane including the reinforcing rib 20 shown in FIG. 4. The Piezo electric element 32 of a disc shape is polarized in a direction perpendicular to a plane thereof, wherein each of the two sides includes a pair of electrodes 33 and 34, and 35 and 36 respectively disposed opposite to one another about a plane including the rib 20 shown in FIG. 4. The electrodes 31 and 36 are respectively connected to two amplifiers 37 and 38 including a noise balancing means therebetween, while the electrodes 32 and 34 are grounded. The noises are cancelled between the two amplifiers and a pure signal is obtained by combining the signals from the two amplifiers 37 and 38. In this embodiment, the need of an inverting amplifier is eliminated.

Figure 7:
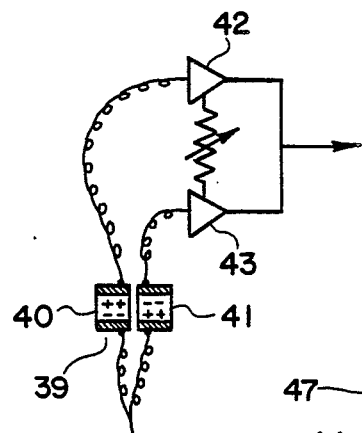
FIG. 7 illustrates a further embodiment of the electronic circuit refining the electric signals from a further embodiment of the Piezo electric elements included in the transducer shown in FIG. 4.

In FIG. 7 there is illustrated a cross section of a further embodiment of the Piezo electric transducer 39 including a pair of semicircular disc Piezo electric elements 40 and 41 disposed on two opposite sides about a plane including the rib 20 shown in FIG. 4, which two Piezo electric elements are polarized in opposite directions, wherein the electrodes thereof disposed on the first side are respectively connected to the amplifiers 42 and 43 including a noise balancing means therebetween, while the electrodes on the second side of the Piezo electric elements are grounded. This embodiment also eliminates the need for an inverting amplifier such as the element 30 shown in FIG. 5.

Figure 8:
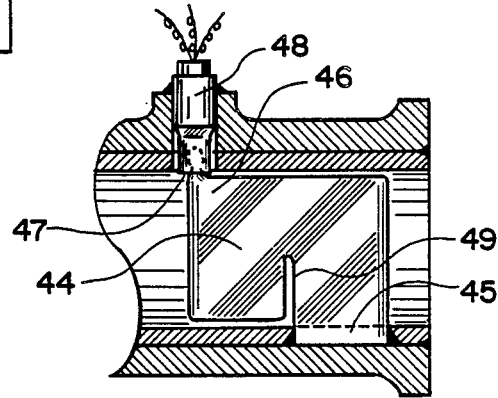
FIG. 8 illustrates a cross section of another embodiment of the vortex flowmeter including a vortex sensing planar member with a significant chord length.

In FIG. 8 there is illustrated a cross section of a part of a vortex flowmeter employing another embodiment of the vortex sensing planar member, wherein the vortex generating bluff body is not shown for the brevity of the illustration. The one extremity 45 of the vortex sensing planar member 44 is secured to the wall of the flow passage, while the other extremity 46 is connected to the force transmitting member 47 extending from the transducer assembly 48. A calibration device such as the element 12 shown in FIGS. 1 and 3 can be readily included in the embodiment shown in FIG. 8. The slit 49 partially separating the unsecured upstream half of the planar member 44 from the secured downstream half is included in order to enhance the deflectivity of the portion of the planar member connected to the transducer 48, which slit 49 may be omitted, and the extremity 45 of the planar member 44 may be secured to the wall of the flow passage in entirety in another design variation.

In FIG. 9 there is illustrated a further embodiment of the vortex sensing planar member 50 with the downstream half of one extremity 51 secured to the wall of the flow passage, which extends at least partially across a cross section of the flow passage in a cantilever-like arrangement. The unsecured upstream half 52 partially separated from the secured downstream half by a slit 53 is connected to the transducer 54 by a mechanical coupling 55. The calibration device such as that shown in FIG. 3 is not shown for the brevity of the illustration.

In FIG. 10 there is illustrated yet another embodiment of the vortex sensing planar member 56 that is secured to the wall of the flow passage at both extremities, wherein a deflective midportion 57 thereof is connected to the planar force transmitting member 58 extending from the transducer 59. The slit 60 is included to enhance the deflectivity of the mid-portion of the planar member. The calibration device such as that shown in FIG. 3 is not shown for the brevity of the illustration.

In FIG. 11 there is illustrated yet a further embodiment of the vortex sensing planar member 61 comprising two separate halves 62 and 63 respectively secured to the wall of the flow passage and extending therefrom in a cantilever-like arrangement, wherein the two halves of the planar member 61 are connected to one another at the extremities thereof in an easily bending arrangement 64. The upstream portion 65 of the first half 62 of the planar member 61 extending fully across a cross section of the flow passage is connected to the transducer 66 by a mechanical coupling. The calibration device such as that shown in FIG. 3 is not shown for the brevity of the illustration.

In FIG. 12 there is illustrated another cross section of the vortex sensing planar member 61 taken along plane 12—12 as shown in FIG. 1. The two halves 62 and 63 respectively secured to the diametrically opposite portions of the wall of the flow passage and extending towards one another in a cantilever-like arrangement are coupled to one another in an easily bending arrangement 64 such as a free bending tongue and groove or hinge joint.

In FIG. 13 there is illustrated still another embodiment of the vortex sensing planar member 67 that is fabricated as an integral part of the sleeve lining the flow passage. The planar member 67 includes a blind hole 68 extending through the wall of the sleeve and following the length thereof to a midsection of the planar member 67, which hole is engaged by an elongated force transmitting member 69 extending from the transducer 70 in a clearance relationship, wherein the extremity 71 of the force transmitting member 69 is secured to the wall of the hole 68. The calibration device such as that shown in FIG. 3 may be included to exert a mechanical impulse on the planar member 67 or the force transmitting member 69. This embodiment is particularly adapted for the vortex flowmeter including a rubber or plastic lining covering the wetted surface of the flowmeter.

In FIG. 14 there is illustrated another embodiment of the calibration device having the same objective and function as that shown in FIG. 3. An axially movable rod 72 with a ferromagnetic extremity 73 is spring biased towards the deflective portion 74 of the vortex sensing planar member 75 by a coil spring 76. The solenoid coil 77 attracts the ferromagnetic extremity 73 thereto and keeps the rod 72 separated from the planar member 75. The flange 78 of the rod 72 and the flowmeter body 79 are connected to one another by an axially flexible coupling 80 such as a bellow coupling which allows the rod to move axially over a small distance. When the solenoid coil 77 is deenergized, the rod 72 impacts on the planar member 75 with an impulse of known magnitude determined by the coil spring 76, which impulse generates a pulse of electrical signal from the transducer. The amplitude ratio between the mechanical impulse on the planar member and the electric pulse from the transducer generated thereby provides the conversion factor that converts the amplitude of the electrical signal from the transducer to the amplitude of the fluid dynamic force experienced by the vortex sensing planar member, from which in combination with the frequency of the vortex shedding the mass flow rate of the fluid is determined.

In FIG. 15 there is illustrated a further embodiment of the calibration device that comprises a rod 81 with a ferromagnetic extremity 82 disposed in an axially movable arrangement. The axially flexible coupling 83 such as a bellow coupling connects the flange 84 of the rod 81 to the flowmeter body 85. As long as the solenoid coil 86 remains deenergized, the axially compressible coupling keeps the rod 81 separated from the vortex sensing planar member 87. When the solenoid coil 86 is energized by a pulse of electric current, the ferromagnetic extremity 82 is attracted thereto and the rod 81 exerts a mechanical impulse of known magnitude determined by the amount of the pulse of electrical current to the planar member, which impulse generates a pulse of electrical signal from the transducer. The amplitude ratio between the mechanical impulse on the planar member and the electrical pulse from the transducer determines the conversion factor converting the amplitude of the electrical signal from the transducer to the amplitude of the fluid dynamic force experienced by vortex sensing planar member.

In FIG. 16 there is illustrated yet another embodiment of the calibration device that comprises a pair of Piezo film bimorphs 88 and 89 respectively affixed to the two opposite sides of the vortex sensing planar member 90. When the conductor wires 91 and 92 respectively connected to the two bimorphs 88 and 89 are switched in a pulse to the positive and negative terminals of an electric power source, respectively, the bimorphs exert a bending moment of known magnitude determined by the amount of the electromotive pulse delivered to the bimorphs, which bending moment generates a pulsed electrical signal from the transducer. The conversion factor converting the electric signals from the transducer to the fluid dynamic force experienced by the vortex sensing planar member is determined from the amplitude ratio provided by the calibration device.

In FIG. 17 there is illustrated a method for calibrating the Piezo electric transducer shown in FIG. 5. When the pair of normally grounded electrodes 94 and 95 are switched off from the grounding terminal and switched on to the positive and negative terminals of an electric power source, the pair of electrodes 96 and 97 on the other side of the Piezo electric transducer generates a pulsed electric signal. The amplitude ratio between the input and output electromotive forces accurately determines the conversion factor converting the amplitude of the electrical signals from the transducer to the fluid dynamic force experienced by the vortex sensing planar member as long as the mechanical stiffness of the combination including the vortex sensing planar member and the thin wall of the transducer container vessel from which the force transmitting member extends remains constant. The Piezo electric transducers shown in FIGS. 6 and 7 can be calibrated by switching off the two grounded electrodes from the grounding terminal and switching to two terminals supplying electromotive forces of opposite signs.

In FIG. 18 there is illustrated yet a further embodiment of the calibration device that includes a ferromagnetic ball 98 contained within a sealed circular cylindrical cavity 99 disposed in a nonhorizontal position and affixed to the vortex sensing planar member 100. The electromagnet 101 keeps the ball 98 away from the planar member 100 as long as the solenoid coil of the electromagnet 101 is energized. When the solenoid coil of the electromagnet 101 is deenergized, the ball drops down and impacts on the planar member 100, which action exerts an impulse of known magnitude determined by the weight of the ball 98 on the planar member and provides the information required to find the amplitude ratio defining the conversion factor.

In FIG. 19 there is illustrated still another embodiment of the calibration device including a pendulous mass 102 designed to impact on a thin flange 103 anchoring an elongated member 104 connected to the vortex sensing planar member 105, when the solenoid coil of the electromagnet 105 is deenergized, which exerts an impulse of known magnitude on the planar member 105.

In FIG. 20 there is illustrated still a further embodiment of the calibration device. One extremity 107 of the vortex sensing planar member 108 is secured to a flange 109 affixed to the wall of the flow passage. An extension 110 with a ferromagnetic extremity 111 extends from the flange 109 in a direction opposite to the planar member 108. An electromagnet 112 energized by a pulsed electric current exerts a bending impulse of known magnitude on the planar member 108. Instead of the electromagnet 112, a mass 113 propelled by a mechanical spring or by the weight thereof as demonstrated in FIGS. 14 and 19 may be employed to exert an impulse of known magnitude on the planar member, wherein the ferromagnetic extremity 111 is replaced by a rigid target.

In FIG. 21 there is illustrated a cross section of a vortex flowmeter comprising a vortex generator-sensor 114 of an elongated cylindrical shape, that is disposed across a cross section of the flow passage 115, wherein one extremity 116 of the vortex generating-sensing bluff body 114 is secured to the wall 117 of the flow passage and the other extremity 118 is connected to the force transmitting member 119 extending from the transducer assembly 120 by a mechanical coupling 121.

In FIG. 22 there is illustrated another cross section of the embodiment shown in FIG. 21, which cross section is taken along plane 22—22 as shown in FIG. 21. The secured extremity 116 of the bluff body 114 may include a thin section 122 in order to enhance the transmission of the fluid dynamic force on the bluff body to the transducer 120. The bluff body 144 may have a hollow construction in order to keep the resonance frequency thereof above the range of the vortex shedding frequencies. It takes only a modest amount of imagination to incorporate one of the calibration means shown in FIGS. 14, 15, 16, 17, 18, 19 and 20 into the embodiment shown in FIGS. 21 and 22, which embodiment operates on the same principles as those described in conjunction with FIGS. 1, 2, 3 and 4. The transducer 120 may be a Piezo electric type such as one of those illustrated in FIGS. 4, 5, 6 and 7, or a strain gauge or capacitance type transducer.

In FIG. 23 there is illustrated a cross section of another embodiment of the vortex flowmeter comprising a vortex generator-sensor 123 of an elongated cylindrical shape disposed across a cross section of the flow passage 124 and secured to the wall 125 of the flow passage at both of the two extremities thereof. The vortex generating-sensing bluff body 123 includes a blind hole 126 disposed following the length of the bluff body and extending to a midsection thereof, which hole is engaged by an elongated force transmitting member 127 extending from the transducer assembly 128 in a clearance relationship, wherein the extremity of the elongated force transmitting member is pressure fitted into the blind end of the hole 126. This embodiment of the vortex flowmeter is particularly suitable for the flowmeters requiring lining of the wetted areas with a rubber or plastic material in order to accommodate corrosive fluids, as the bluff body 123 can be formed as an integral part of the insertion sleeve with a plastic material. One or more thin sections 129, 130, 131 etc. may be included in the bluff body at the two secured extremities and the midsection thereof, etc.

In FIG. 24 there is illustrated a cross section of the insertion type vortex generator-sensor of an elongated cylindrical shape. The vortex generating bluff body 132 extending from an anchoring flange 133 includes a pair of planar cavities 134 and 35 disposed on planes generally parallel to the direction of the fluid flow in a side by side arrangement, which planar cavities respectively contain two planar members 136 and 137 connected to two transducers 138 and 139 at the first extremities, respectively, and secured to the bluff body at the second extremities thereof. One side wall of the planar cavity 134 includes one or more openings 141, 142, 143, etc. open to one lateral side surface 143 of the bluff body 132, while the other side wall includes one or more openings 144, 145, 146, etc. open to the other lateral side 147 of the bluff body 132, which openings are provided by a plurality of short tubings disposed across the planar cavity 135 and through the clearance hole included in the planar member 137. The planar cavity 135 is sealed off from the space external to the bluff body.

In FIG. 25 there is illustrated another cross section of the embodiment shown in FIG. 24, which cross section is taken along plane 25—25 as shown in FIG. 24. The conductor wires extending from the transducer 138 are routed through the two wiring holes 148 and 149. This insertion type vortex generator-sensor operates on the same principles as those described in conjunction with the embodiment shown in FIGS. 1, 2, 3 and 4. The two electrical signals respectively generated by the two transducers are combined in such a way that the noise is cancelled therebetween and a pure signal representing the vortices is obtained. The transducers 138 and 139 may be the Piezo electric type such as that shown in FIGS. 4, 5, 6 and 7, or other types employing strain gauge or capacitive motion sensors. The calibration device shown in FIG. 17 can be readily incorporated into the embodiment shown in FIGS. 24 and 25.

In FIG. 26 there is illustrated another embodiment of the insertion type vortex generator-sensor that includes a pair of planar members 150 and 151 respectively contained in a pair of planar cavities 152 and 153 included in a tandem arrangement within the vortex generating bluff body 154 extending from the anchoring flange 155. The planar cavity 152 is sealed off from the space external to the bluff body 154, while the two side walls of the planar cavity 153 respectively include openings 156 and 157 open to lateral sides 158 and 159 of the bluff body, respectively. This embodiment of the insertion type vortex generator-sensor operates on the same principles as those of the embodiment shown in FIG. 24 and 25. The anchoring flange 155 may be disposed at a midsection of the bluff body 154 intermediate the two planar members 150 and 151.

While the principles of the invention have now been made clear by the illustrative embodiments, there will be immediately obvious to those skilled in the art many modifications and various equivalents in the structures, arrangements, proportions, elements and materials which are particularly adapted to specific working environments and operating conditions in the practice of the invention without departing from those principles. It is not desired to limit the invention to the particular illustrated embodiments shown and described and, accordingly, all suitable modifications and equivalents may be resorted to falling within the scope of the inventions as defined by the claims which follow.

The embodiment of the invention, in which an exclusive proporty or priviledge is claimed, are defined as follows:

1. A method for determining rate of fluid flow comprising procedures for:
    (a) generating vortices by partially obstructing a flow passage with an elongated cylindrical member disposed thereacross;
    (b) detecting frequency and amplitude of a fluctuating electrical signal generated by a transducer connected to a deflective portion of a planar member disposed in the flow passage downstream of the elongated cylindrical member and experiencing a fluctuating fluid dynamic force created by the vortices;
    (c) determining velocity of the flow from the frequency of the fluctuating electrical signal representing the fluctuating fluid dynamic force created by the vortices and experienced by the planar member;
    (d) determining amplitude of the fluctuating fluid dynamic force created by the vortices and experienced by the planar member from the amplitude of the fluctuating electrical signal by using a conversion relationship calibrated by using a ratio of amplitude of a mechanical impulse of known magnitude generated by momentum of a mass impacting on the combination of the planar member and the transducer to the amplitude of an electrical signal generated by the transducer as a result of the mechanical impulse of known magnitude; and
    (e) determining mass flow rate of the fluid from a combination of the velocity of the fluid flow determined from the frequency of the fluctuating electrical signal and the amplitude of the fluctuating fluid dynamic force determined from the amplitude of the fluctuating electrical signal.

2. The method as set forth in claim 1 wherein the density of the fluid is determined as a ratio of the mass flow rate to the velocity of the fluid flow.

3. The method as set forth in claim 1 wherein said momentum of the mass is created by Earth's gravitational pull.

4. The combination as set forth in claim 1 wherein said momentum of the mass is created by a spring force launching the mass.

5. A method for determining rate of fluid flow comprising procedures for:
    (a) a generating vortices by partially obstructing a flow passage with an elongated cylindrical member disposed thereacross;
    (b) detecting frequency and amplitude of a fluctuating electrical signal generated by a transducer connected to a deflective portion of a planar member disposed in the flow passage downstream of the elongated cylindrical member and experiencing a fluctuating fluid dynamic force created by the vortices;
    (c) determining velocity of the fluid flow from the frequency of the fluctuating electrical signal representing the fluctuating fluid dynamic force created by the vortices and experienced by the planar member;
    (d) determining amplitude of the fluctuating fluid dynamic force created by the vortices and experienced by the planar member from the amplitude of the fluctuating electrical signal by using a conversion relationship calibrated by using a ratio of amplitude of a mechanical impulse of known magnitude generated by an electromagnetic force momentarily acting on the combination of the planar member and the transducer to the amplitude of an electrical signal generated by the transducer as a result of the mechanical impulse of known magnitude; and
    (e) determining mass flow rate of the fluid flow from a combination of the velocity of the fluid flow determined from the frequency of the fluctuating electrical signal and the amplitude of the fluctuating fluid dynamic force determined from the amplitude of the fluctuating electrical signal.

6. The method as set forth in claim 5 wherein density of the fluid is determined as a ratio of the mass flow rate to the velocity of the fluid flow.

7. A method for determining rate of fluid flow comprising procedures for:

generating vortices by partially obstructing a flow passage with an elongated cylindrical member disposed thereacross;

(b) detecting frequency and amplitude of a fluctuating electrical signal generated by a Piezo electric transducer connected to a deflective portion of a planar member disposed in the flow passage downstream of the elongated cylindrical member and experiencing a fluctuating fluid dynamic force created by the vortices; wherein the fluctuating electrical signal is supplied by at least one of first pair of electrodes included in the Piezo electric transducer and respectively disposed on two opposite sides of a plane including the planar member;

(c) determining velocity of the fluid flow from the frequency of the fluctuating electrical signal representing the fluctuating fluid dynamic force created by the vortices and experienced by the planar member;

(d) determining amplitude of the fluctuating fluid dynamic force created by the vortices and experienced by the planar member from the amplitude of the fluctuating electrical signal by using a conversion relationship calibrated by using a ratio of the amplitude of an electrical pulse of known magnitude imposed across a second pair of electrodes included in the Piezo electric transducer and respectively disposed on two opposite sides of the plane including the planar member to the amplitude of an electrical signal generated by the Piezo electric transducer as a result of the electrical pulse of known magnitude; and (e) determining mass flow rate of the fluid flow from a combination of the velocity of the fluid determined from the frequency of the electrical signal and the amplitude of the fluctuating fluid dynamic force determined from the amplitude of the fluctuating electrical signal.

8. The combination as set forth in claim 7 wherein density of the fluid is determined as a ratio of the mass flow rate to the velocity of the fluid flow.

9. An apparatus for measuring flow rate of fluid comprising in combination:

(a) a body including a flow passage;

(b) a vortex generator of an elongated cylindrical shape disposed across a first cross section of the flow passage;

(c) a vortex sensor of a planar shape disposed at least partially across a second cross section of the flow passage generally parallel to the vortex generator on a plane generally parallel to the central axis of the flow passage, wherein at least one extremity of said vortex sensor is secured to said body at least in part; and (d) a transducer means including a force transmitting member connected to a deflective portion of said vortex sensor by a mechanical coupling, wherein said force transmitting member transmits a minute bending deflection of the vortex sensor about an axis generally parallel to the central axis of the flow passage to a transducer element included in the transducer means:

wherein a fluctuating fluid dynamic force created by the vortices shed from the vortex generator and experienced by the vortex sensor generates a fluctuating electrical signal from the transducer means as a measure of the fluid flow through the flow passage.

10. The combination as set forth in claim 9 wherein velocity of the fluid is determined from frequency of the fluctuating electrical signal.

11. The combination as set forth in claim 10 wherein mass flow rate of the fluid is determined from a combination of the velocity of the fluid and the amplitude of the fluctuating electrical signal.

12. The combination as set forth in claim 11 wherein density of the fluid is determined as a ratio of the mass flow rate to the velocity of the fluid.

13. The combination as set forth in claim 11 wherein said combination includes means for exerting a mechanical impulse of known magnitude to the combination of the vortex sensor and the transducer means, and means for measuring amplitude of an electrical pulse generated by the transducer means as a result of said mechanical impulse of known magnitude, wherein the ratio of the magnitude of said mechanical impulse to the amplitude of said electrical pulse is used as a calibration standard in determining amplitude of the fluctuating fluid dynamic force from the amplitude of the fluctuating electrical signal.

14. The combination as set forth in claim 13 wherein said mechanical impulse is created by the momentum of a mass generated by the Earth's gravitational pull and impacting on the combination of the vortex sensor and the transducer means.

15. The combination as set forth in claim 13 wherein said mechanical impulse is created by the momentum of a mass generated by a spring force launching the mass and impacting on the combination of the vortex sensor and the transducer means.

16. The combination as set forth in claim 13 wherein said mechanical impulse is created by an electromagnetic force momentarily acting on the combination of the vortex sensor and the transducer means.

17. The combination as set forth in claim 13 wherein said mechanical impulse is created by an electrical pulse of known magnitude imposed across a first pair of electrodes included in a Piezo electric element contained in the transducer means, wherein the first pair of electrodes are respectively disposed on two opposite sides of a plane including the vortex sensor, and the fluctuating electrical signal is supplied by at least one of second pair of electrodes included in the Piezo electric element and respectively disposed on the two opposite sides of said plane.

* * * * *